US008953011B2

(12) United States Patent
Lang et al.

(10) Patent No.: US 8,953,011 B2
(45) Date of Patent: Feb. 10, 2015

(54) DISPLAY DEVICE FOR VISUALLY-DEPICTING FIELDS OF VIEW OF A COMMERCIAL VEHICLE

(75) Inventors: Werner Lang, Ergersheim (DE); Stefan Bauer, Gerhardshofen (DE)

(73) Assignee: MEKRA Lang GmbH & Co. KG, Fuerth (DE)

( * ) Notice: Subject to any disclaimer, the term of this patent is extended or adjusted under 35 U.S.C. 154(b) by 424 days.

(21) Appl. No.: 13/367,985

(22) Filed: Feb. 7, 2012

(65) Prior Publication Data

US 2012/0200664 A1   Aug. 9, 2012

(30) Foreign Application Priority Data

Feb. 8, 2011   (DE) .......................... 10 2011 010 624

(51) Int. Cl.
| H04N 9/74 | (2006.01) |
| H04N 7/18 | (2006.01) |
| H04N 5/225 | (2006.01) |
| B60Q 1/00 | (2006.01) |
| B60R 1/00 | (2006.01) |

(52) U.S. Cl.
CPC ............. *B60R 1/00* (2013.01); *B60R 2300/105* (2013.01); *B60R 2300/301* (2013.01); *B60R 2300/303* (2013.01); *B60R 2300/802* (2013.01)
USPC ............. 348/36; 348/148; 348/149; 348/373; 340/425.5

(58) Field of Classification Search
USPC .................................... 348/30–161
See application file for complete search history.

(56) References Cited

U.S. PATENT DOCUMENTS

| 5,760,828 | A | 6/1998 | Cortes |
| 6,693,524 | B1 | 2/2004 | Payne |
| 7,079,017 | B2 | 7/2006 | Lang et al. |
| 7,446,650 | B2 * | 11/2008 | Scholfield et al. ............ 340/438 |
| 7,454,128 | B2 | 11/2008 | Lang et al. |
| 7,574,287 | B2 | 8/2009 | Lang et al. |
| 7,697,055 | B2 | 4/2010 | Imoto et al. |
| 7,825,951 | B2 | 11/2010 | Lang et al. |
| 8,004,394 | B2 * | 8/2011 | Englander ..................... 340/433 |
| 8,624,716 | B2 * | 1/2014 | Englander ..................... 340/433 |
| 2001/0052845 | A1 | 12/2001 | Weis et al. |

(Continued)

FOREIGN PATENT DOCUMENTS

| DE | 195 39 642 A1 | 11/1996 |
| DE | 199 00 498 A1 | 7/2000 |

(Continued)

OTHER PUBLICATIONS

Office Action from corresponding Japanese application 2012-023065 dated Oct. 8, 2013, and English translation.

(Continued)

*Primary Examiner* — Sath V Perungavoor
*Assistant Examiner* — Talha Nawaz
(74) *Attorney, Agent, or Firm* — J-Tek Law PLLC; Jeffrey D. Tekanic; Scott T. Wakeman

(57) ABSTRACT

A display device for visually depicting legally-prescribed fields of view of a commercial vehicle in a driver's cab of the commercial vehicle includes at least one display unit. The display device permanently and in real time displays at least two fields of view, which are legally-prescribed to be permanently displayed during operation of the vehicle, on the display unit in the driver's cab in a common image.

34 Claims, 4 Drawing Sheets

(56) References Cited

U.S. PATENT DOCUMENTS

| | | |
|---|---|---|
| 2002/0113876 A1* | 8/2002 | Kim .................... 348/148 |
| 2003/0085999 A1 | 5/2003 | Okamoto et al. |
| 2003/0122930 A1* | 7/2003 | Schofield et al. ............. 348/148 |
| 2003/0137586 A1* | 7/2003 | Lewellen ................ 348/148 |
| 2004/0004541 A1* | 1/2004 | Hong .................... 340/435 |
| 2004/0017282 A1* | 1/2004 | Eguchi et al. ............. 340/425.5 |
| 2004/0036768 A1 | 2/2004 | Green |
| 2004/0169762 A1 | 9/2004 | Imoto |
| 2004/0223074 A1 | 11/2004 | Takada |
| 2005/0174429 A1* | 8/2005 | Yanai .................... 348/148 |
| 2006/0215020 A1 | 9/2006 | Mori et al. |
| 2006/0251502 A1 | 11/2006 | Scharfenberger |
| 2007/0209436 A1* | 9/2007 | Akita et al. ................ 73/495 |
| 2008/0122597 A1 | 5/2008 | Englander |
| 2008/0180351 A1* | 7/2008 | He .................... 345/1.1 |
| 2008/0246843 A1* | 10/2008 | Nagata et al. ................ 348/148 |
| 2008/0276191 A1* | 11/2008 | Breed .................... 715/771 |
| 2009/0213037 A1* | 8/2009 | Schon .................... 345/7 |
| 2009/0244361 A1* | 10/2009 | Gebauer et al. ............. 348/373 |
| 2009/0290369 A1* | 11/2009 | Schofield et al. ............. 362/494 |
| 2010/0091379 A1 | 4/2010 | Lang et al. |
| 2010/0117815 A1* | 5/2010 | DeLine et al. ............. 340/440 |
| 2010/0238288 A1* | 9/2010 | Klaerner et al. ............. 348/148 |
| 2011/0058041 A1* | 3/2011 | Kister .................... 348/149 |
| 2011/0080277 A1 | 4/2011 | Traylor et al. |
| 2011/0115913 A1 | 5/2011 | Lang et al. |
| 2011/0317049 A1 | 12/2011 | Kurane et al. |
| 2012/0013742 A1* | 1/2012 | Fairchild et al. ............. 348/148 |
| 2012/0069184 A1 | 3/2012 | Hottmann |
| 2012/0154591 A1* | 6/2012 | Baur et al. ................ 348/148 |
| 2013/0038735 A1 | 2/2013 | Nishiguchi et al. |
| 2013/0083196 A1* | 4/2013 | Zheng .................... 348/148 |
| 2013/0155236 A1* | 6/2013 | Ramdeo .................... 348/148 |
| 2013/0229522 A1* | 9/2013 | Schofield et al. ............. 348/148 |
| 2013/0314539 A1 | 11/2013 | Lang et al. |
| 2014/0036081 A1 | 2/2014 | Lang et al. |
| 2014/0058653 A1* | 2/2014 | Schofield et al. ............. 701/118 |

FOREIGN PATENT DOCUMENTS

| | | |
|---|---|---|
| DE | 102005028144 A1 | 12/2006 |
| DE | 10 2006 020 511 A1 | 11/2007 |
| EP | 1 018 839 A2 | 7/2000 |
| EP | 1 302 365 A2 | 4/2003 |
| EP | 1 705 623 A1 | 9/2006 |
| GB | 2 351 055 A | 12/2000 |
| JP | H04-71939 | 3/1992 |
| JP | H08-84277 A | 3/1996 |
| JP | 2001114048 A | 4/2001 |
| JP | 2002-022463 A | 1/2002 |
| JP | 2002-109697 | 4/2002 |
| JP | 2003-320911 A | 11/2003 |
| JP | 2007110572 A | 4/2007 |
| JP | 2007282098 A | 10/2007 |
| JP | 2007-320359 A | 12/2007 |
| JP | 2008-149764 | 7/2008 |
| KR | 1020100089362 A | 8/2010 |
| WO | 2011/061238 A1 | 5/2011 |

OTHER PUBLICATIONS

Office Action from corresponding Chinese application 2012-10024370.X mailed Jan. 30, 2014, and English translation.

Extended European Search Report for EP application No. 12 15 3489, including Search Report, Search Opinion and translations thereof.

Office Action mailed Jun. 4, 2013 from JPO for counterpart JP application No. 2012-023065, including translation thereof.

Un-published U.S. Appl. No. 14/173,859.

Communication mailed Jan. 4, 2013 from EPO for counterpart EP application No. 12 153 489, including translation thereof.

Office Action dated Jun. 11, 2014, from related Korean Patent Application No. 10-2014-0034858 and English translation thereof.

* cited by examiner

DISPLAY DEVICE FOR VISUALLY-DEPICTING FIELDS OF VIEW OF A COMMERCIAL VEHICLE

CROSS-REFERENCE

The present application claims priority to German patent application no. 10 2011 010 624.3 filed Feb. 8, 2011, the contents of which are fully incorporated herein by reference.

TECHNICAL FIELD

The present invention relates to a display device for visually-depicting fields of view of a commercial vehicle in a driver's cab of the commercial vehicle.

BACKGROUND

In motor vehicles, "fields of view" are legally-prescribed (required by law) in accordance with the type of the motor vehicle, such as e.g., motorcycles, motor vehicles for transporting passengers, motor vehicles for transporting goods, etc. The fields of view must be provided by one or more "device for indirect viewing", which is conventionally a mirror, and the fields of view must be visible or viewable by a driver sitting in the driver's seat using the device(s) for indirect viewing. Depending upon the type of the vehicle and, in particular, which areas around the vehicle that can be directly seen by the driver, different legal provisions require, depending upon the vehicle type, that certain fields of view can be seen at all times using the device(s) for indirect viewing.

Therefore, for commercial vehicles, such as e.g., trucks or delivery vehicles, e.g., a primary mirror is currently provided on each of the driver's side and the passenger's side as devices for indirect viewing. Using the primary mirror, the vehicle driver can see a level and horizontal part of the road surface of a certain width, which extends from a stipulated distance behind the vehicle driver's eye point up to the horizon. In addition, a band of lesser width must be visible or viewable for the vehicle driver using this mirror, which band begins at a short distance behind the driver's eye point. The area near the vehicle, which can be viewed using the primary mirror and is legally required to be always visible or viewable, will be designated in the following as the "field of view of the primary mirror".

In addition to these two primary mirrors, fields of view provided by wide-angle mirrors are required to be seen on both sides of the commercial vehicle. Each area behind the driver's eye point is viewed using the wide-angle mirrors in a defined length in the longitudinal direction of the vehicle. Although this area is wider than the area viewable by the driver using the primary mirror; it extends only a certain (shorter) length along the side of the vehicle.

In accordance with the applicable legal provisions for implementing or providing the required fields of view, commercial vehicles further require a close-proximity mirror. Using the close-proximity mirror, an area lying in the front area next to the driver's cab and an area directly adjacent to the driver's cab are visible or viewable by the driver. Finally, for at least some types of commercial vehicles, one additional field of view is required to provided, e.g., by a front mirror. Using this additional (e.g., front) mirror, an area directly in front of the commercial vehicle, which area extends in the lateral direction of the commercial vehicle beyond the passenger-side edge of the commercial vehicle, is viewable by the driver.

However, in spite of these legally-prescribed mirrors and/or devices for indirect viewing, it is scarcely possible and/or very difficult for a vehicle driver to completely and sufficiently maintain in view at all times the areas around a commercial vehicle that are prone to accidents. Moreover, due to the plurality of mirrors, the burden on the vehicle driver to substantially simultaneously maintain all of these mirrors in view increases. Moreover, because the fields of view are provided using mirrors, the mirrors disrupt the smooth flow of air around the vehicle while driving as a consequence, such that vehicle drag is increased and thus fuel consumption is increased.

A display device is known from WO 2011/061238 A1 (post-published prior art with respect to the priority date of the present application). A device for monitoring the surroundings of vehicles having at least first and second monitoring devices is described therein. The monitoring devices output display signals to a control device. A display device connected with a control device is capable of depicting the display signals from the monitoring devices in a split-screen mode in at least two sections. The control device is connected with a state of motion signaling line so that it causes the at least two display signals from the monitoring devices to be displayed on the display device in the split screen mode in accordance with the state of motion of the vehicle.

Further, a display device is known from DE 10 2006 020 511 A1. To transmit video signals from at least one camera at the tail of a motor vehicle and/or motor vehicle trailer to at least one display unit in the motor vehicle, in particular a truck, the video signals output by the camera are digitalized and encoded, while performing a data compression in real time, and then these encoded video signals are impressed on a power supply voltage system and transmitted via the power supply voltage system. The encoded video signals transmitted via the supply voltage system are subsequently filtered out from the power supply voltage system, decoded and/or decompressed and supplied to the display unit for image rendering.

SUMMARY

It is therefore an object of the present teachings to provide an improved display device and a method for visually-depicting the legally-prescribed fields of view of a commercial vehicle, with which the fields of view can be monitored in a clearly-arranged and simple manner for the vehicle driver and which also minimizes the influence on the air flow around the vehicle while driving.

The concept underlying the present display device is to provide, instead of a mirror as a conventional means for indirectly viewing the legally-prescribed fields of view of a vehicle, a display device, with which at least a part of the fields of view, which are legally-prescribed to be permanently visible or viewable while driving, can be permanently displayed on at least one display unit disposed inside the vehicle cabin. Herein, the term "permanently" means that the display of the field(s) of view, for which the present display device is utilized, is not (temporally) interrupted by other inputs, so that the driver can view the legally-prescribed field(s) of view with a glance at the display unit. But, "permanently" is also intended to mean that the display of the legally-prescribed field(s) of view is continuously provided at least while driving the commercial vehicle. The term "permanently" optionally be broadened to also include the ignition state of the vehicle (i.e. the engine is running but the vehicle is not moving) and/or, e.g., to include a state, in which a driver is located in the vehicle (but the engine is not yet running), e.g., in accordance with the detection of a key device located within the vehicle and/or in the vicinity of the vehicle.

Because at least two of the legally-prescribed fields of view are displayed on a common image within the driver's cab, it makes it easier for the driver, in view of the improved ergonomics, to maintain an overview of what is happening in the at least two displayed fields of view, because instead of a plurality of display units disposed outside the vehicle cabin (i.e. mirrors), the driver can view a single display unit that displays the at least two fields of view in a common image.

For example, a screen and/or a display can be provided as the display unit, but these are not exclusive. In the alternative, display units according to present teachings also include one or more projections on an interior vehicle console part (e.g., a dashboard) or the like.

In contrast to passenger motor vehicles, the driver of a commercial vehicle must simultaneously maintain an overview of a plurality of not-directly visible fields of view. In addition, the driver's direct view around the commercial vehicle is substantially limited in comparison to passenger motor vehicles. Therefore, the display of a plurality of fields of view on a common display unit in a common image is particularly helpful for drivers of commercial vehicles, because larger areas of the surrounding of the commercial vehicle are depicted in a single display, if desired, at a single location in the driver's cab. Moreover, one or more mirrors, which conventionally would be attached on the outside of the vehicle, can thereby be omitted. As a result, the direct view for the driver is improved, because the (omitted) mirrors do not hinder the direct view, and also the air flow around the vehicle is less influenced or obstructed, which can have a positive effect on fuel consumption.

Further, the display device according to at least one embodiment of the present teachings offers the advantage that supplemental information can be simultaneously superimposed in the image of the permanently-displayed fields of view. For example, in a common image of the fields of view of a primary mirror and a wide-angle mirror on the same side of the commercial vehicle, such supplemental information can be, e.g., the rear trailer edge. In such an embodiment, in addition to the visual information provided by the depicted, legally-prescribed field of view, the vehicle driver can simultaneously derive information concerning his/her vehicle position in the image from this supplemental (e.g., vehicle position) information.

The display device for visually-depicting legally-prescribed fields of view of a commercial vehicle according to the present teachings can be utilized for all of the legally-prescribed fields of view of a commercial vehicle or for only a selected portion thereof. In particular, it is possible, e.g., to replace the passenger-side primary and wide-angle mirrors of the commercial vehicle, which are opposite of the driver's side, with the present display device, whereas other mirrors, e.g., the driver's side primary and wide-angle mirrors, can be maintained. In the alternative, some or all of the devices for indirect viewing, which have been embodied as mirrors up to now, can be replaced with the display device.

It is particularly preferred to display the fields of view of a primary mirror and a wide-angle mirror on the same side of the commercial vehicle in the common image, or according to further preferred embodiment, any other combination of neighboring fields of view, which are depicted bordering one another and transitioning into one another and/or overlapping. This means that a continuous portrayal of the surroundings of the commercial vehicle is possible on, e.g., the vehicle side opposite of the driver, with a single image. This is particularly advantageous with regard to the driver's comprehension of the legally-prescribed fields of view and thus overall improves safety in road traffic. In the alternative, the fields of view can be depicted in the split-screen mode, which means that the driver has available two or more different displayed images, e.g., each field of view on one split-screen view, on the common display unit.

The fields of view of a primary mirror and a wide-angle mirror of the same vehicle side can be captured, sensed, recorded or detected either by a common image capture unit or by a plurality of different image capture units. If a common (single) image capture unit is provided, then a high-resolution sensor and a panamorph lens can be used. A panamorph lens is a lens that can realize or provide different resolutions for different image areas.

More preferably, the visual depiction on the display unit(s) of the display device contains the fields of view of a left primary mirror and/or a left wide-angle mirror as well as the fields of view of a right primary mirror and/or a right wide-angle mirror. It is thus particularly preferred to visually depict on the display unit the field of view of the left primary mirror and/or the left wide-angle mirror on the left and to visually depict on the display unit the field of view of the right primary mirror and/or the right wide-angle mirror on the right. For the driver, this simplifies the orientation on the display unit, because it corresponds to the orientation of the conditions around the vehicle when the driver is looking in the forward vehicle direction. The orientation in the up-down (vertical) direction of the fields of view of a primary mirror or a wide-angle mirror is preferably arranged such that, with reference to the driver, farther forward-lying areas are portrayed farther above in the image and, with reference to the driver, farther rearward-lying areas are portrayed farther below in the image.

As used in this specification, the directions "forward", "rearward", "left" and "right" are each based upon the forward driving direction of the commercial vehicle.

In the alternative or in addition to the above-described embodiments, the display device can be adapted to show in the common image the field of view of a close-proximity mirror and/or a front mirror. Similar to the common image of the fields of view of a primary mirror and a wide-angle mirror, in particular when the information from these mirrors is displayed on the display unit in manner adjacent to one another and/or in an overlapping manner, the orientation on the display unit can be simplified for the vehicle driver. Thus, the information concerning the traffic situation within the areas of the fields of view can be more simply derived by the driver.

When the field of view of a close-proximity mirror and/or a front mirror is depicted in addition to the field of view of one or more primary mirror(s) and/or wide-angle mirror(s), it is preferred to visually depict the field of view of the close-proximity mirror and/or the front mirror in the middle of the display unit relative to the left-right direction and to dispose the fields of view of the primary mirror and the wide-angle mirror on the left and right, respectively, of the field of view of the close-proximity mirror and/or the front mirror. It is further preferred to visually depict the field of view of the close-proximity mirror and/or the front mirror farther above in the display unit than the fields of view of the primary mirror and/or the wide-angle mirror. Such an arrangement makes it possible to simplify the image orientation on the display unit for the driver, because this arrangement of image views corresponds to the natural positions of the viewed areas around the commercial vehicle. In particular, it is advantageous to dispose the depicted fields of view on the display unit where they correspond to their positions around the commercial vehicle, i.e. image contents of a front area above, image contents of a side area on the respective side, and, if additional visual information from the tail area is depicted, to depict it below.

Preferably, the display device is adapted to show the fields of view in a bird's eye perspective or bird's eye view (i.e. from above the vehicle). Distortions of the depicted fields of view are thereby avoided as much as possible. In addition, the image corresponds to the image, which the driver could see, if it would be possible (i.e. if the viewing angle was not blocked by a portion of the commercial vehicle), out of the driver's cab in a corresponding natural direct viewing. Because the driver's cabin is considerably elevated relative to the street surface, the bird's eye view is thus sensible.

The display in the bird's eye perspective can be achieved, e.g., by appropriately converting and displaying images captured by the image capture unit(s), e.g., the images captured by a camera or another image sensor.

If the fields of view are permanently depicted on the display unit at the same position and with the same size, it is easier for the driver to readily comprehend which areas he/she is viewing on the display unit. This means that, independent of the driving situation or other exterior influences, the fields of view are always depicted at the same position in the screen and with the same size.

In the alternative, it is possible to visually depict the fields of view on the display unit in a varying manner, e.g., with respect to their size or position, depending upon, e.g., the driving situation or state. However, it must be ensured that the legally-prescribed fields of view are depicted and are visible (viewable) at all times. For example, it is possible to adapt or modify the visual depiction of the fields of view depending upon the driving speed, so that the visual depiction of the information from the front area of the vehicle is enlarged and the visual depiction of information from the tail area is smaller when slowly driving (e.g., 30 km/h); on the other hand, the visual depiction of the front area is scaled down and the visual depiction toward the rear is enlarged when driving faster, i.e., e.g., >50 km/h. Finally, when driving in reverse, the focus can lie on the depiction of the information around the passenger side.

In a preferred embodiment, the display device may be further adapted to visually depict additional viewing areas on the display unit, i.e. in addition to the legally-prescribed fields of view. In such an embodiment, a dynamic, i.e. varying, depiction of the contents on the display unit is particularly preferred. Such additional viewing areas may include areas that lie outside of the legally-prescribed fields of view. Such additional viewing areas can contain, e.g., information from the front area of the commercial vehicle that is outside of the legally-prescribed fields of view and/or information from the tail area of the commercial vehicle, which is captured, e.g., by one or more additional reverse driving (rear view) cameras. In such an embodiment, it is particularly useful when the image contents are dynamically depicted to show a forwardly-expanded view on the display unit when driving slowly. That is, when driving slowly, an additional viewing area that shows information from the front area of the commercial vehicle may be depicted; however, information up to the horizon in the tail area may be omitted. On the other hand, when driving faster, supplemental information from viewing areas in the tail area could be simultaneously depicted in addition to the legally-prescribed fields of view. For example, information captured by one or more rear view cameras and/or image capture units in the tail area may be displayed together with information from fields of view of the primary mirror and the wide-angle mirror.

The information is thus preferably depicted on the display unit such that the information from the viewing areas in the area behind the vehicle is at least partially overlapping and/or blended with fields of view from the primary mirror and the wide-angle mirror. In this case, when driving forward fast, e.g., during a passing maneuver, a vehicle, which is not located in the legally-prescribed field of view, but is located in the additionally depicted viewing area(s), is recognizable in the image display of the side vehicle surroundings. This additional visual information further increases driving safety.

Finally, when driving in reverse, image information from the viewing areas of the tail area could be depicted larger, as well as the entire passenger side, i.e. the fields of view of the primary mirror and the wide-angle mirror on the passenger side, could be portrayed. Both images could respectively reach to the horizon so that the driver also has a good orientation when driving in reverse. For this purpose, at least one reverse driving (rear view) camera is preferably provided to capture the information from the tail area of the commercial vehicle.

Furthermore, it is possible to visually depict the additional viewing areas, which are visually depicted in addition to the legally-prescribed fields of view, only when necessary and/or differently or varying with respect to their position(s) on the display unit. For example, at slower and/or faster forward driving speeds, the supplemental information can be depicted in the middle of the display unit with reference to the tail area of the commercial vehicle, and in a relatively smaller dimension. On the other hand, during reverse driving, the information from the tail area may occupy not only a middle area, but also it may project into side areas of the image due to an enlarged depiction of the image from the vehicle tail area.

Information from the tail area is preferably depicted so that areas nearer to the vehicle lie farther below in the image and areas farther from the vehicle are portrayed farther above in the image, i.e. as a driver looking out the rear window would observe.

In another preferred embodiment, it is possible to superimpose supplemental information into the image(s) of the depiction of the legally-prescribed fields of view as well as the depiction of the additional viewing areas. For example, position information, which is information that utilizes the vehicle as its reference, may be superimposed in the corresponding image(s). For example, the distance to the vehicle in a certain direction, e.g., the separation from the trailer edge towards the rear, can be superimposed into the corresponding image. It is also possible to show the rearward trailer edge of the commercial vehicle in the corresponding image(s). The depiction of the rearward trailer edge of the commercial vehicle considerable increases traffic safety, in particular during passing maneuvers. In such driving situations, the driver can see at all times around the vehicle and can recognize when he/she can return to the non-passing lane again after the passing maneuver, because the overtaken vehicle is clearly recognizable in the image as being located in front of or behind the rearward trailer edge. The position of the commercial vehicle can be observed particularly well when a so-called overlay function is utilized. This is also an option for the embodiment, in which only one field of view is respectively displayed in each image using the display device. For example, the superimposing of such supplemental information on the display unit is also possible for an exclusive depiction of the field of view of a primary mirror or for an exclusive depiction of the field of view of a wide-angle mirror.

The display device may be designed such that it has a single display unit, independent of the number of depicted fields of view. For example, the visual information normally provided by all of the replaced (omitted) mirrors, e.g., the primary mirror and the wide-angle mirror of both the driver's side and the passenger's side, as well as the front mirror and the close-proximity mirror, could be displayed using a single display unit, e.g., a screen, which is disposed, e.g., on a dashboard in the driver's cab. Supplemental information or information from supplemental viewing areas could also be superimposed onto this single image.

In the alternative, it is possible to provide a plurality of display units, which are separated from one another and which could be disposed, as required, at different positions in the vehicle. For example, if the primary mirror and the wide-angle mirror of both vehicle sides are replaced, then separate display units could be provided for the field of view of the left primary mirror and the field of view of the left wide-angle mirror and for the field of view of the right wide-angle mirror and the field of view of the right primary angle mirror, respectively. These display units could be disposed, e.g., at suitable locations on the left and on the right, respectively, in the driver's cabin, e.g., close to the positions of conventional mirrors. In the alternative, such separated display units could be disposed at a central location in the driver's cab. In this case, it is preferred to arrange the displays so as to correspond to the depicted positions of the vehicle surroundings, e.g., to depict left side areas of the vehicle on the left and to depict right side areas of the vehicle on the right.

For capturing the information of the to-be-depicted fields of view, at least one image capture unit, preferably a plurality of image capture units, is provided, such as e.g., cameras, image sensors and/or other image capturing means. The number of image capture units is preferably greater than the number of display units. Such an embodiment offers the advantage, e.g., of enabling information for each to-be-captured field of view to be redundantly captured by at least two image capture units. Therefore, if one of the image capture units breaks down, the permanent display of the legally-prescribed field of view remains ensured. In addition, by providing a plurality of image capture units for certain to-be-depicted areas, the required dynamics in the display of the fields of view can be ensured more easily.

Moreover, by utilizing a greater number of image capture units than display units, the image angle required for a respective field of view can be obtained by combining the information from a plurality of the image capture units, e.g., two or more image capture units. Thus, it is possible to achieve the required resolution for the display while using relatively low resolution image capture units.

Preferably, the resolution of the image capture units is higher than the resolution of the at least one display unit and amounts to at least 2 M pixels. The higher the resolution of the image capture unit is, which can be considerably higher than 2 M pixels, e.g., in the range of 6-8 M pixels, the better is the possibility to optimize the display of the to-be-depicted information, i.e. the fields of view, because more inputted information is available than to-be-outputted information. Preferably, when a plurality of image capture units is utilized, different resolutions are utilized in the respective image capture units, according to necessity and, e.g., distance to the to-be-captured area. Thus, it is further preferred that the resolution of the image capture unit for the field of view of the primary mirror is higher than 2 M pixels, whereas image capture units for other fields of view can have lower resolutions.

Preferably, the display unit includes a power supply that is independent of the on-board power supply. This is particularly important in order to make the display of the fields of view available also in vehicle situations, in which the vehicle is stationary and is turned-off, i.e., the ignition is off. It is particularly important that a vehicle driver can view, at least when necessary, information within the legally-prescribed fields of view and, if necessary, additional viewing areas when the vehicle is stationary and the ignition is off. This embodiment increases safety and reduces the likelihood of accidents.

In order to ensure a permanent display of the fields of view on the one hand and to simultaneously minimize operating errors or the like by the user, it is advantageous if the display unit includes no or hardly any additional operating elements.

BRIEF DESCRIPTION OF THE DRAWINGS

In the following, the invention will be described in a purely exemplary manner with the assistance of the appended Figures.

DETAILED DESCRIPTION OF THE INVENTION

Figure 1:
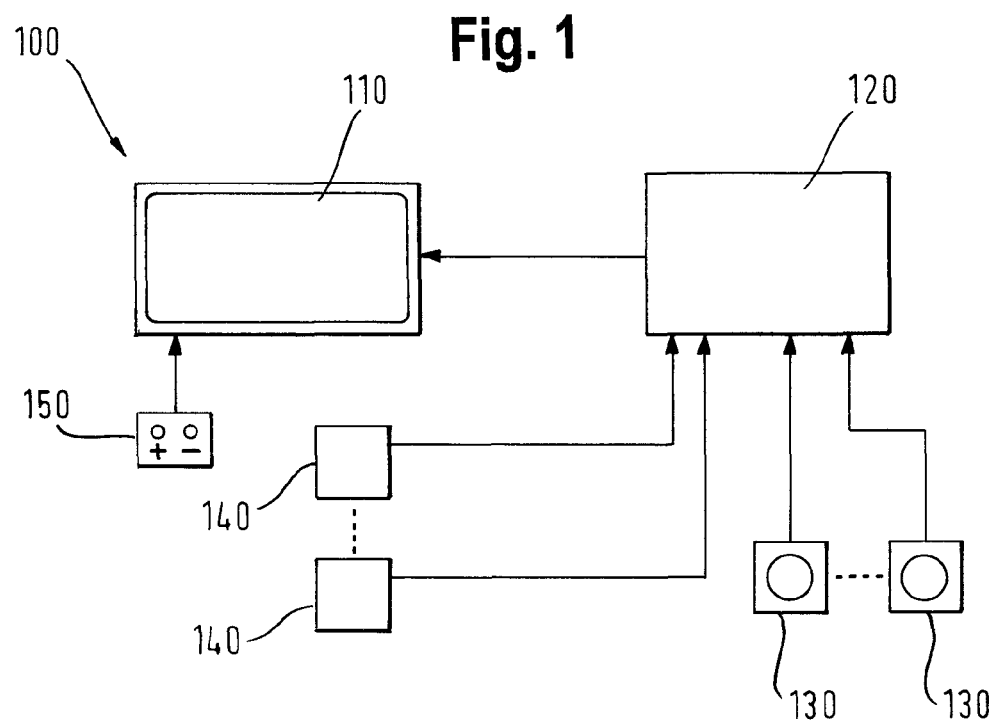
FIG. 1 shows a schematic illustration of a display device according to the present teachings.
Figure 2:
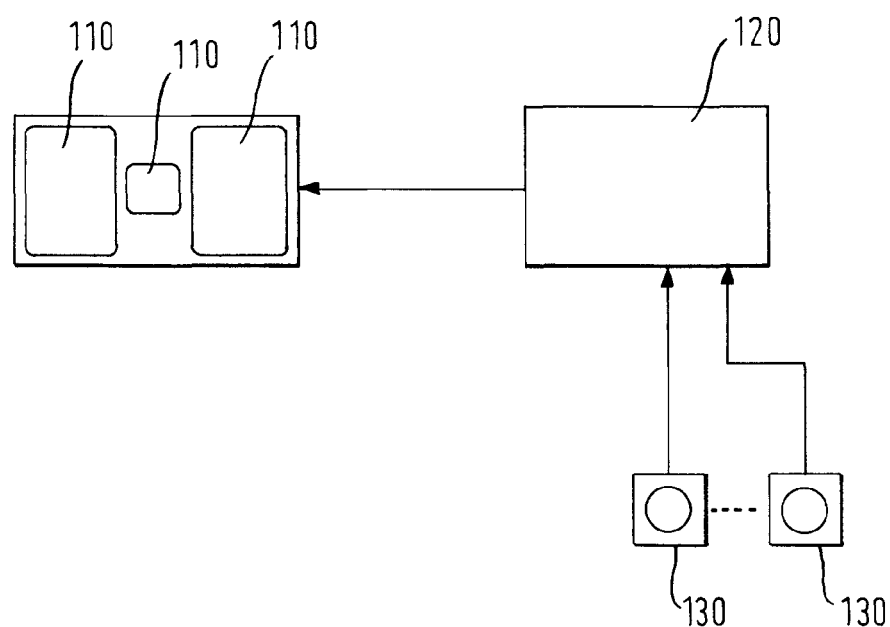
FIG. 2 shows an alternative arrangement of the display device according to FIG. 1.

FIGS. 1 and 2 each schematically show a device 100 for visually depicting legally-prescribed fields of view of a commercial vehicle. In the case of FIG. 1, the display device 100 includes a single display unit 110, whereas in the case of FIG. 2, a plurality of display units 110 is provided. This/these display unit(s) 110 is/are disposed in the driver's cab of the commercial vehicle. Further, the display device 100 includes, e.g., at least one CPU 120 or other computing unit(s) for processing the information captured by one or more image capture units 130 and for supplying this processed information to the display unit(s) 110 in the form of the legally-prescribed fields of view according to the selected depiction, preferably in a bird's eye view or perspective. The image capture units 130 can be provided in any arbitrary number as required, i.e. in accordance with the number and the nature of the fields of view to be depicted on the display unit(s) 110.

In addition, the display device 100 according to FIG. 1 includes connections to various sensors 140, e.g., one or more sensors for detecting the vehicle speed and/or the vehicle state, etc., in order to be able to dynamically, i.e. dependent upon the vehicle state and/or the vehicle speed, depict image contents and information on the display unit 110. For this purpose, the sensors 140 are also connected with the CPU(s) 120, which derive(s) or calculate(s) the to-be-depicted image from the sensor information and the image information from the image capture units 130.

In the embodiment illustrated in FIG. 2, no sensors 140 are provided. Thus, the depiction of the image contents on the display unit is independent of the vehicle speed and the vehicle state.

Information that is sensed by the image capture unit(s) 130 is supplied to the CPU(s) 120, as well as information from the sensor(s) 140, if provided. The CPU(s) 120 process(es) this information so that, by suitably outputting the processed information to the one or more display units 110, the legally-prescribed fields of view of a commercial vehicle can be depicted on the display unit(s) 110. Two of the legally-prescribed fields of view can be shown in a common image on at least one of the display units 110.

FIG. 1 also shows a power supply device 150 that supplies power to the display device 100, and in particular the display unit 110, independently of an on-board power supply, which is supplies power various vehicle systems, such as lights, dashboard displays, radio, etc. when the engine is running or when the ignition key has been turned to a power-on position.

The power supply device 150 preferably outputs a regulated current and voltage suitable for driving at least the display unit 110, although it preferably also drives the CPU 120, image capture unit(s) 130 and sensor(s) 140, if provided, so that the entire system can operate, even if the vehicle ignition switch is turned off.

The power supply device 150 can be adapted to obtain power directly from the vehicle battery and/or the vehicle alternator/generator system. In the alternative, the power supply device 150 may contain a separate rechargeable battery that may be connectable to an external energy source or to solar cells or even to an alternator/generator configured to recover energy from deceleration of the vehicle (e.g., an electronic brake).

The display device of FIG. 2 optionally also may receive power from an independent power supply device in a manner similar to the embodiment of FIG. 1.

Figure 3:
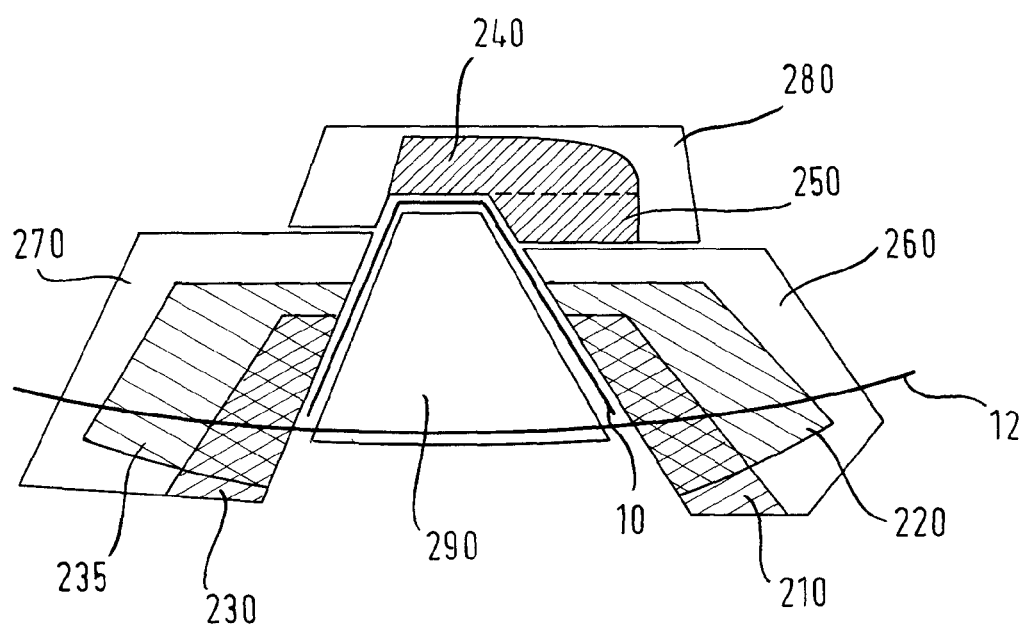
FIG. 3 shows an exemplary image depicted on the display unit of the display device according to FIG. 1 at fast driving speeds.
Figure 4:
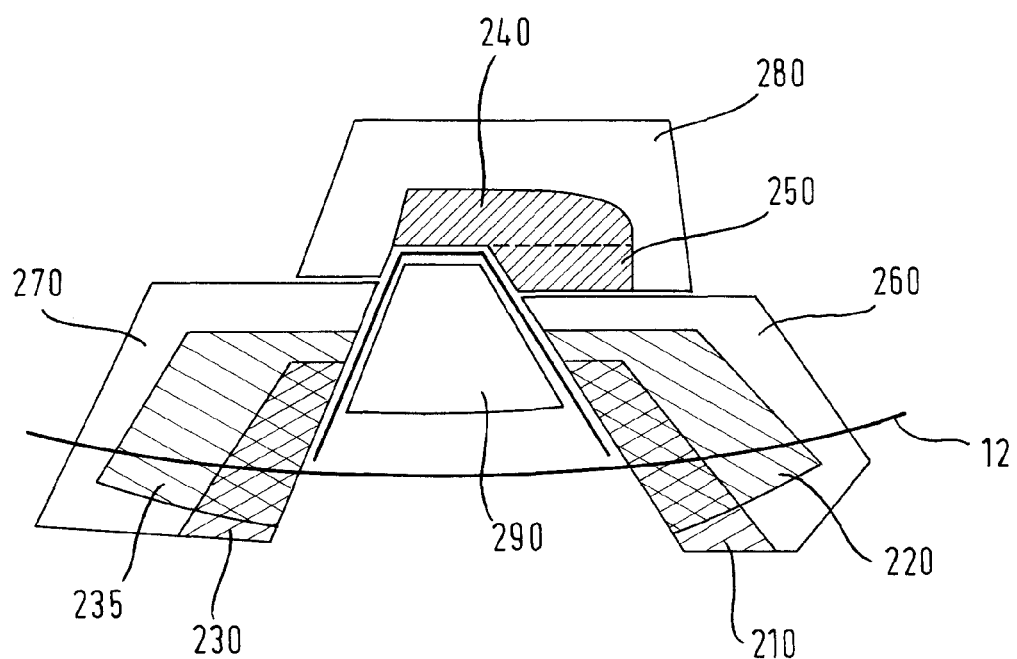
FIG. 4 shows an exemplary image depicted on the display device according to FIG. 1 at slow driving speeds.
Figure 5:
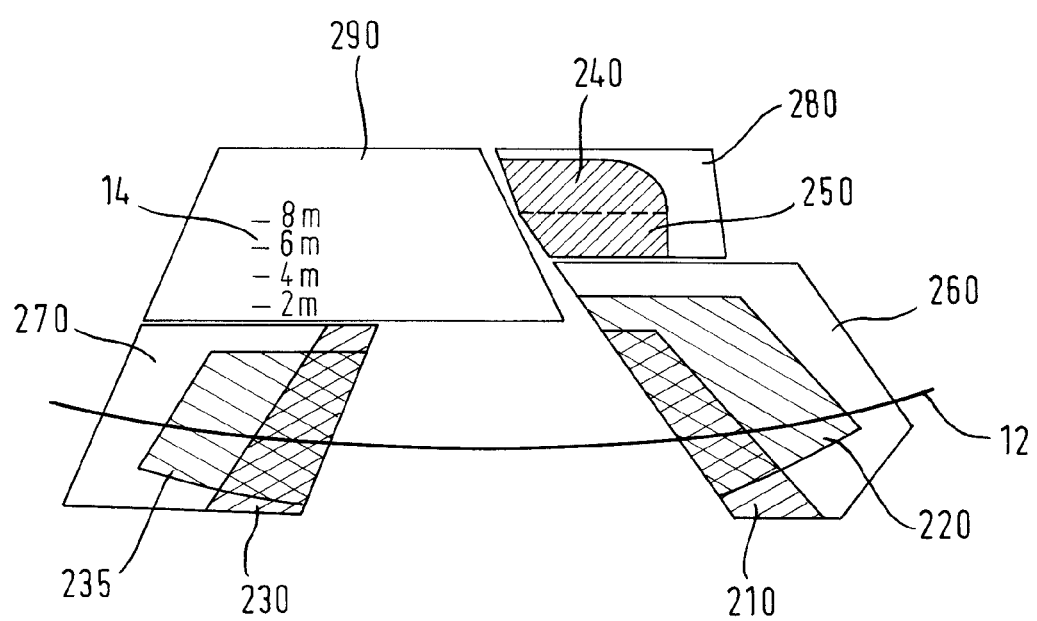
FIG. 5 shows an exemplary image depicted on the display device according to FIG. 1 when driving in reverse.

FIGS. 3 to 5 show the information depicted on the display unit 110 of FIG. 1 for three driving states of the commercial vehicle. The driving states are sensed, e.g., by the sensor(s) 140. More specifically, FIG. 3 shows a display when driving fast, which is e.g., above 50 km/h, FIG. 4 shows a display when driving slower, e.g., below 30 km/h or below 50 km/h and FIG. 5 shows a display when driving in reverse. The displays shown in FIG. 3 and FIG. 4 correspond to a temporal and, with respect to the vehicle state, varying depiction, which is portrayed on a screen (display unit 110) of a display device 100 according to FIG. 1.

In the image depicted in FIG. 3, the contour of the commercial vehicle at a fast forward driving speed is schematically indicated with reference numeral 10. The rear trailer edge 12 of the commercial vehicle is also shown schematically in the image. In the image depicted in FIG. 3, which can be viewed on the display unit 110 according to FIG. 1, the field of view 210 of a right primary mirror, the field of view 220 of a right wide-angle mirror, the field of view 230 of a left primary mirror, the field of view 235 of a left wide-angle mirror, as well as the fields of view 240, 250 of a front mirror and a close-proximity mirror are shown in a common image. Therefore, as can be understood from FIG. 3, the field of view 210 of the right primary mirror and the field of view 220 of the right wide-angle mirror are overlapping in a common image and in a common area of the display. These fields of view are depicted in the display unit 110 on the right side, i.e. corresponding to the viewing direction of the driver in the driver's cab on the particular side, whose information they depict. The field of view 230 of the left primary mirror and the field of view 235 of the left wide-angle mirror are depicted in the image on the left side. In the depicted embodiment, the left primary mirror is the driver's side primary mirror. The image display arrangements illustrated in FIGS. 3 to 5 relate to an embodiment for vehicles equipped for right-hand driving, in which the vehicle driver sits on the left side of the driver's cab. On the other hand, in vehicles equipped for left-hand driving, the arrangement of the image would be reversed or inverted with respect to the vehicle longitudinal axis in an axis-symmetric manner.

In an upper area of the image on the display unit 110, the fields of view 240, 250 of the front mirror and the close-proximity mirror are shown above in the image, i.e. above the fields of view 210, 220, 230, 235 for the right and left primary and wide-angle mirrors, respectively, in the plane of the drawing. The fields of view 240 and 250 for the front mirror and the close-proximity mirror, respectively, directly border on each other and are depicted as transitioning into or joining one another in the image, so that the driver can view and be aware of the area around the driver's cab as a unit.

In addition, viewing areas, which exceed and thus supplement the legally-prescribed field of views 210, 220, 230, 235, 240 and 250, are depicted on the display unit 110. In particular, two side viewing areas 260 and 270 extend towards the side and rearward on the left side and the right side of the commercial vehicle, respectively. In addition, a front viewing area 280 extends to the sides directly in front of the driver's cabin of the commercial vehicle, so as to directly border the fields of view 240 and 250 of the front mirror and the close-proximity mirror. The viewing areas 260 to 280 are selected such that they also provide a connection between the fields of view 210 to 250 and transition into these fields of view 210 to 250. As a result, the surroundings of the driver's cabin as well as the commercial vehicle can be continuously depicted on the display unit 110.

In the alternative, it is also possible to respectively depict the viewing areas 260, 270 and 280 as well as the fields of view contained within these viewing areas on separate display units 110. Also, it is obviously not necessary, as in the present embodiment, for the display device 100 to replace all mirrors from among the left and right primary mirrors, the left and right wide-angle mirrors and the front mirror as well as the close-proximity mirror. Instead, only a portion of these mirrors optionally may be replaced and the display on the display unit 110 can be adapted accordingly. For example, only the viewing area 260 of the right (passenger-) side of the commercial vehicle may be depicted on the display unit 110, and the viewing area 260 will contain the field of the view 210 of the right primary mirror and the field of view 220 of the right wide-angle mirror. In such an embodiment, the other fields of view may be provided by mirrors in a conventional manner.

Furthermore, a viewing area 290 is displayed in the display depicted in FIG. 3 and is disposed between the viewing area 260 for the right side of the commercial vehicle and the viewing area 270 for the left side of the commercial vehicle, i.e. the viewing area 290 is displayed in the middle. This viewing area 290 is a viewing area for the rear area of the commercial vehicle and is, e.g., detected or captured by a reverse driving (rear view) camera serving as an image capture unit 130. The viewing area 290 is depicted on the display unit 110 such that the areas near to the vehicle lie farther below in the image and the areas remote from the vehicle lie farther above in the image.

FIG. 4 shows an arrangement of images corresponding to FIG. 3, but for the slow driving state of the vehicle. Unlike in FIG. 3, here the viewing area 280 for the front surrounding area of the driver's cabin is extended forwardly, so that the driver receives a better overview of the area in front of his/her commercial vehicle. At the same time, the viewing area 290 for the rear area of the vehicle is depicted in a scaled-down or reduced manner. The relative positions of the viewing areas and the fields of view are, however, unchanged as compared to the display shown in FIG. 3 for fast driving. Thus, a depiction of the fields of view and viewing areas, which is adapted to the driving situation or state, is selected by the display device 100. However, it is noted that the legally-prescribed fields of view 210 to 250 always remain permanently visible or viewable.

In the display according to FIG. 3 for fast driving as well as in the display according to FIG. 4 for slow driving, additional information, such as e.g., the information relating to the trailer edge 12, can be inserted or superimposed. It is thereby made easier for the driver to estimate the position of his/her vehicle within the displayed image.

Finally, FIG. 5 shows an embodiment for the displayed image when driving in reverse. Here, another arrangement of the viewing areas and fields of view is selected, so that in particular the viewing area 290 for the rear area of the commercial vehicle is enlarged and is depicted centrally on the display unit 110, in the depicted embodiment above left to the middle in the image. Therefore, the field of view 240 of the front mirror is depicted in a scaled-down manner and/or is cropped, whereas the fields of view 210 and 230 of the right and left primary mirrors, respectively, are also depicted at the same positions, but if necessary also are depicted in a scaled-down or reduced manner. In addition, the fields of view 220, 235 of the (passenger's side) right and (driver's side) left wide-angle mirror also may be reduced or scaled-down. Additional information concerning the trailer edge 12 is superimposed with reference to the fields of view 210 and 230 of the right and the left primary mirror, respectively; also, distance information 14 is superimposed in the viewing area 290 and indicates the distance from the commercial vehicle.

A representative, but not limiting, algorithm for operating the display device according to FIG. 1 is as follows:

capture first image data using an image capture unit and transmit the captured first image data to a memory associated with the CPU, capture second image data using an image capture unit and transmit the captured second image data to the memory associated with the CPU, sense the vehicle driving state and transmit the sensed vehicle driving state to the memory associated with the CPU, sense the vehicle driving speed and transmit the sensed vehicle driving speed to the memory associated with the CPU, access the memory associated with the CPU and use the CPU to determine areas of spatial overlap, if any, of the captured first and second image data, if one or more spatially overlapping areas are found, interpolate pixels within the overlapping spatial areas, generate combined image data by mapping areas of captured image data according to a predetermined spatial arrangement using non-overlapping and interpolated overlapping spatial areas in the captured first and second image data, convert the combined image data into a bird's eye view perspective, scale up or down at least one portion of the combined image data, if necessary, based upon the sensed vehicle driving state and/or the vehicle driving speed, if the screen resolution of the display unit is lower than the resolution of the combined image data, then down-convert the combined image data to the screen resolution, and drive the display unit using the combined image data to show a common image.

Of course, the present teachings are not limited to the above-noted algorithm may be modified in various ways.

For example, instead of interpolating pixels in overlapping spatial areas, the image of the overlapping spatial areas may be generated by using only captured image data from either a higher resolution or a lower resolution image capture unit and by disregarding captured image data from the other image capture unit.

In addition or in the alternative, the above-noted algorithm may be modified by adding the following additional steps:

capture third image data from an additional viewing area, which is outside of a legally-prescribed field of view, using an image capture unit and transmit the captured third image data to a memory associated with the CPU, access the memory associated with the CPU and use the CPU to determine areas of spatial overlap, if any, of the captured first, second and third image data, if one or more spatially overlapping areas are found, interpolate pixels within the overlapping spatial areas, and generate the combined image data by mapping areas of captured image data according to a predetermined spatial arrangement using non-overlapping and interpolated overlapping spatial areas in the captured first, second and third image data.

In addition or in the alternative, the above-noted algorithm may be modified by adding the following additional steps:

access the memory associated with the CPU to retrieve stored position information concerning the commercial vehicle, such as vehicle contour and/or distance from a portion of the vehicle, and superimpose the retrieved position information onto the combined image data by overlaying the retrieved position onto the combined image data.

In summary, the legally-prescribed fields of view of a commercial vehicle, which are not provided using mirrors in the conventional manner, are depicted using the display device, and at least two legally-prescribed fields of view are depicted in a common image. Therefore, not only driving safety can be improved by means of an ergonomic and comprehensive view of the surroundings of the commercial vehicle, but also the air flow around the commercial vehicle can be improved during driving (i.e. drag can be reduced) by omitting one or more large and costly mirrors. This advantageously leads to a reduced fuel consumption and thereby higher efficiency.

Representative, non-limiting examples of the present invention were described in detail above with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved display, as well as methods for making and using the same.

Moreover, the combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Contour of commercial vehicle
12 Trailer edge
14 Distance information
100 Display device
110 Display unit
120 CPU
130 Image capture unit
140 Sensor
150 Power supply
210 Field of view of right primary mirror
220 Field of view of right wide-angle mirror
230 Field of view of left primary mirror
235 Field of view of left wide-angle mirror
240 Field of view of front mirror
250 Field of view of close-proximity mirror
260 Viewing area of right side of the commercial vehicle
270 Viewing area of left side of the commercial vehicle
280 Viewing area of surroundings in front of the driver's cab
290 Viewing area of tail area

The invention claimed is:

1. A display device configured to visually depict fields of view of a commercial vehicle, the display device comprising:
at least one display unit disposed within a driver's cab of the commercial vehicle, the display device being configured to permanently and in real time display at least two fields of view, which are to be permanently displayed during operation of the vehicle, on the display unit in a common image, and a power supply device that is independent of an on-board power supply of the commercial vehicle, wherein the at least two fields of view contain a field of view corresponding to a primary mirror and a field of view corresponding to a wide-angle mirror of the same side of the vehicle, both of which are displayed in the common image, and
wherein the display device includes at least two image capture units configured to respectively capture visual information corresponding to the at least two fields of view.

2. The display device according to claim 1, wherein the at least two fields of view are adjoining and the display device is configured display the at least two fields of view as either directly bordering each other or overlapping each other.

3. The display device according to claim 1, wherein a first of the at least two fields of view contains a field of view corresponding to a left primary mirror and another of the at least two fields of view contains a field of view corresponding to a right primary mirror.

4. The display device according to claim 3, wherein the first of the at least two fields of view further contains a field of view corresponding to a left wide-angle mirror and the another of the at least two fields of view contains a field of view corresponding to a right wide-angle mirror.

5. The display device according to claim 4, wherein the display device is configured to depict at least one of the field of view corresponding to the left primary mirror and the field of view corresponding to the left wide-angle mirror on a left side of the display unit.

6. The display device according to claim 5, wherein the display device is configured to depict at least one of the field of view corresponding to the right primary mirror and the field of view corresponding to the right wide-angle mirror on a right side of the display unit.

7. The display device according to claim 1, wherein the at least two fields of view contain at least one of a field of view corresponding to a close-proximity mirror and a field of view corresponding to a front mirror.

8. The display device according to claim 7, wherein the display device is configured to depict the at least one of the fields of view corresponding to the close-proximity mirror and the field of view corresponding to the front mirror in a middle portion of the display unit relative to a left-right direction.

9. The display device according to claim 1, wherein the display device is configured to display the at least two fields of view in a bird's eye view.

10. The display device according to claim 1, wherein the display device is configured to permanently depict the at least two fields of view on the display unit at the same position and with the same size.

11. The display device according to claim 1, wherein the display device is configured to permanently depict the at least two fields of view on the display unit at least one of at varying positions and with varying sizes.

12. The display device according to claim 11, wherein the display device is configured to display, with reference to the commercial vehicle, position information superimposed on at least one of the fields of view and the viewing areas.

13. The display device according to claim 1, wherein the display device is configured to depict at least one additional viewing area on the display unit, wherein the at least one additional viewing area contains visual information captured at at least one of a front area of the commercial vehicle and a tail area of the commercial vehicle.

14. The display device according to claim 13, further comprising a rear view camera configured to capture visual information at the tail area of the commercial vehicle and to supply the captured visual information to the display unit.

15. The display device according to claim 13, wherein the at least one additional viewing area contains visual information captured at the tail area of the commercial vehicle and the display device is configured to depict the at least one additional viewing area as at least one of overlapping and bordering at least one of a field of view corresponding to a primary mirror and a field of view corresponding to a wide-angle mirror.

16. The display device according to claim 13, wherein the display device is configured to depict the at least one additional viewing area intermittently and in a varying manner with respect to its position on the display unit.

17. The display device according to claim 16, wherein the display device is configured to vary the visual depiction of the at least one additional viewing area on the display unit in accordance with at least one of a detected vehicle speed and a detected vehicle driving direction.

18. The display device according to claim 1, wherein the display device has a single display unit configured to display all depicted fields of view.

19. The display device according to claim 1, wherein the display device includes two, three or four display units, which are separated from each other.

20. The display device according to claim 19, wherein the display device is configured to depict on a first one of the display units, from among all of the to-be-depicted fields of view, only a field of view corresponding to a left primary mirror and a field of view corresponding to a left wide-angle mirror.

21. The display device according to claim 20, wherein the display device is configured to depict on a second one of the display units, from among all of the to-be-depicted fields of view, only a field of view corresponding to a right primary mirror and a field of view corresponding to a right wide-angle mirror.

22. The display device according to claim 21, wherein the display device is configured to depict on a third one of the display units, from among all of the to-be-depicted fields of view, only a field of view corresponding to at least one of a close-proximity mirror and a front mirror.

23. The display device according to claim 1, further including at least one image capture unit configured to capture visual information corresponding to at least one of the at least two fields of view.

24. The display device according to claim 23, wherein the at least one image capture unit has a resolution that is higher than the resolution of the at least one display unit.

25. The display device according to claim 23, wherein the at least one of the image capture unit has a resolution that is at least 2 M pixels.

26. The display device according to claim 1, further including a plurality of image capture units configured to respectively capture visual information corresponding to the at least two fields of view, the number of image capture units being greater than the number of the display units.

27. The display device according to claim 1, wherein:
the display device is configured to combine the at least two sets of field of view information captured by the at least two image capture units into a single to-be-depicted field of view.

28. The display device according to claim 1, wherein
the at least two image capture units comprise a first image capture unit and a second image capture unit,
the first image capture unit has a first resolution and is configured to capture a first angle of view corresponding to at least one of the two fields of view, and
the second image capture unit has a second resolution and is configured to capture a second angle of view corresponding to the at least one of the two fields of view, the second angle of view being different from the first angle of view and the first resolution being higher than the second resolution.

29. The display device according to claim 28, wherein the first angle of view is smaller than the second image angle of view.

30. The display device according to claim 28, wherein the display device is configured to show the first and second angles of view respectively captured by the first and second image capture units on a single display unit without overlap, and
the display device is configured to show a confluence portion of a field of view of a primary mirror and a field of view of a wide-angle mirror of the same vehicle side on the single display unit.

31. The display device according to claim 30, wherein the first angle of view is smaller than the second image angle of view.

32. The display device according to claim 1, further including a power supply device that is independent of an on-board power supply of the commercial vehicle.

33. A display device configured to visually depict fields of view of a commercial vehicle, the display device comprising:
at least one display unit disposed within a driver's cab of the commercial vehicle, the display device being configured to permanently and in real time display at least two fields of view, which are to be permanently displayed during operation of the vehicle, on the display unit in a common image, wherein the at least two fields of view contain a field of view corresponding to a primary mirror and a field of view corresponding to a wide-angle mirror of the same side of the vehicle, both of which are displayed in the common image, and further including
a power supply device that is independent of an on-board power supply of the commercial vehicle.

34. A display device configured to visually depict fields of view of a commercial vehicle, the display device comprising:
at least one display unit disposed within a driver's cab of the commercial vehicle, the display device being configured to permanently and in real time display at least two fields of view, which are to be permanently displayed during operation of the vehicle, on the display unit in a common image, and
further including a power supply device that is independent of an on-board power supply of the commercial vehicle,
wherein the at least two fields of view contain:
a field of view corresponding to a primary mirror and a field of view corresponding to a wide-angle mirror from a left side of the commercial vehicle,
a field of view corresponding to a primary mirror and a field of view corresponding to a wide-angle mirror from a right side of the commercial vehicle,
a field of view corresponding to a close-proximity mirror,
a field of view corresponding to a front mirror, and
a field of view corresponding to a tail area of the commercial vehicle,
wherein the display device further comprises a plurality of image capture units configured to respectively capture visual information corresponding to all the fields of view and at least four additional viewing areas, the at least four additional viewing area respectively containing visual information corresponding to a front area, the left and right sides and the tail area of the commercial vehicle, and
the display device is further configured to:
permanently depict the fields of view and the additional viewing areas on the display unit in a bird's eye view at least one of at varying positions and with varying sizes that depend upon at least one of a detected vehicle speed and a detected vehicle driving direction, and
display, with reference to the commercial vehicle, position information superimposed on at least one of the fields of view and the additional viewing areas.

* * * * *